(12) United States Patent
Kondoh

(10) Patent No.: US 10,887,303 B2
(45) Date of Patent: Jan. 5, 2021

(54) INFORMATION PROCESSING SYSTEM, SERVER, AND METHOD FOR GENERATING ASSOCIATION INFORMATION

(71) Applicant: SHARP KABUSHIKI KAISHA, Osaka (JP)

(72) Inventor: Katsuyoshi Kondoh, Sakai (JP)

(73) Assignee: SHARP KABUSHIKI KAISHA, Osaka (JP)

(*) Notice: Subject to any disclaimer, the term of this patent is extended or adjusted under 35 U.S.C. 154(b) by 39 days.

(21) Appl. No.: 16/297,987

(22) Filed: Mar. 11, 2019

(65) Prior Publication Data

US 2019/0281041 A1 Sep. 12, 2019

(30) Foreign Application Priority Data

Mar. 12, 2018 (JP) ................. 2018-044506

(51) Int. Cl.
*H04L 29/06* (2006.01)
*G10L 15/22* (2006.01)
(Continued)

(52) U.S. Cl.
CPC ............ *H04L 63/083* (2013.01); *G10L 15/22* (2013.01); *G10L 15/30* (2013.01); *H04W 12/003* (2019.01); *H04W 12/06* (2013.01); *G10L 2015/223* (2013.01); *H04N 1/00403* (2013.01); *H04N 1/00477* (2013.01); *H04N 2201/0094* (2013.01)

(58) Field of Classification Search
CPC ..... H04L 63/083; H04L 67/125; H04L 9/088; G10L 15/22; G10L 15/30; G10L 2015/223; G10L 17/24; G10L 15/265; G10L 15/26; H04W 12/06; H04W 12/003; H04N 2201/0094; H04N 1/00403; H04N 1/00477; H04N 1/4413; H04N 1/4433;
(Continued)

(56) References Cited

U.S. PATENT DOCUMENTS

2007/0124807 A1 5/2007 Jau
2009/0328165 A1* 12/2009 Cook .................... G06F 21/445
726/6
(Continued)

FOREIGN PATENT DOCUMENTS

CN 1976278 A 6/2007
CN 107566314 A 1/2018
(Continued)

*Primary Examiner* — Kambiz Zand
*Assistant Examiner* — Aubrey H Wyszynski
(74) *Attorney, Agent, or Firm* — ScienBiziP, P.C.

(57) ABSTRACT

An information processing system includes a first sound reception apparatus, a first server, and a second server. The first sound reception apparatus includes an input unit and a communication unit. The input unit receives an input password. The communication unit transmits the input password and identification information regarding the first sound reception apparatus. The second server includes a generation unit, a determination unit, and an information generation unit. The determination unit determines whether the input password and the generated password match. The information generation unit generates first association information on the basis of a result of the determination made by the determination unit.

8 Claims, 16 Drawing Sheets

(51) Int. Cl.
*G10L 15/30* (2013.01)
*H04W 12/06* (2009.01)
*H04W 12/00* (2009.01)
*H04N 1/00* (2006.01)

(58) Field of Classification Search
CPC ........... H04N 1/00127; H04N 1/00244; H04N 1/00411; H04N 1/00472
USPC .......................................................... 726/6
See application file for complete search history.

(56) References Cited

U.S. PATENT DOCUMENTS

| | | |
|---|---|---|
| 2014/0366101 A1 | 12/2014 | Murata |
| 2015/0052350 A1* | 2/2015 | Aumasson .......... H04L 63/0884 713/155 |
| 2018/0083957 A1 | 3/2018 | Murata |
| 2019/0273737 A1 | 9/2019 | Cai et al. |

FOREIGN PATENT DOCUMENTS

| | | |
|---|---|---|
| JP | 2013-178726 A | 9/2013 |
| WO | 2013/118614 A1 | 8/2013 |

\* cited by examiner

FIG. 6

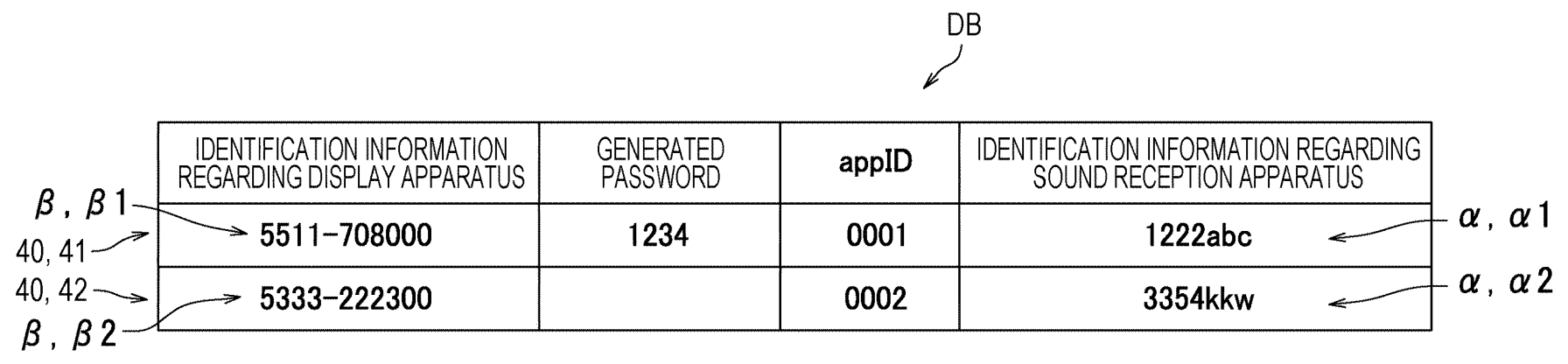

| IDENTIFICATION INFORMATION REGARDING DISPLAY APPARATUS | GENERATED PASSWORD | appID | IDENTIFICATION INFORMATION REGARDING SOUND RECEPTION APPARATUS |
|---|---|---|---|
| 5511-708000 | 1234 | 0001 | 1222abc |
| 5333-222300 | | 0002 | 3354kkw |

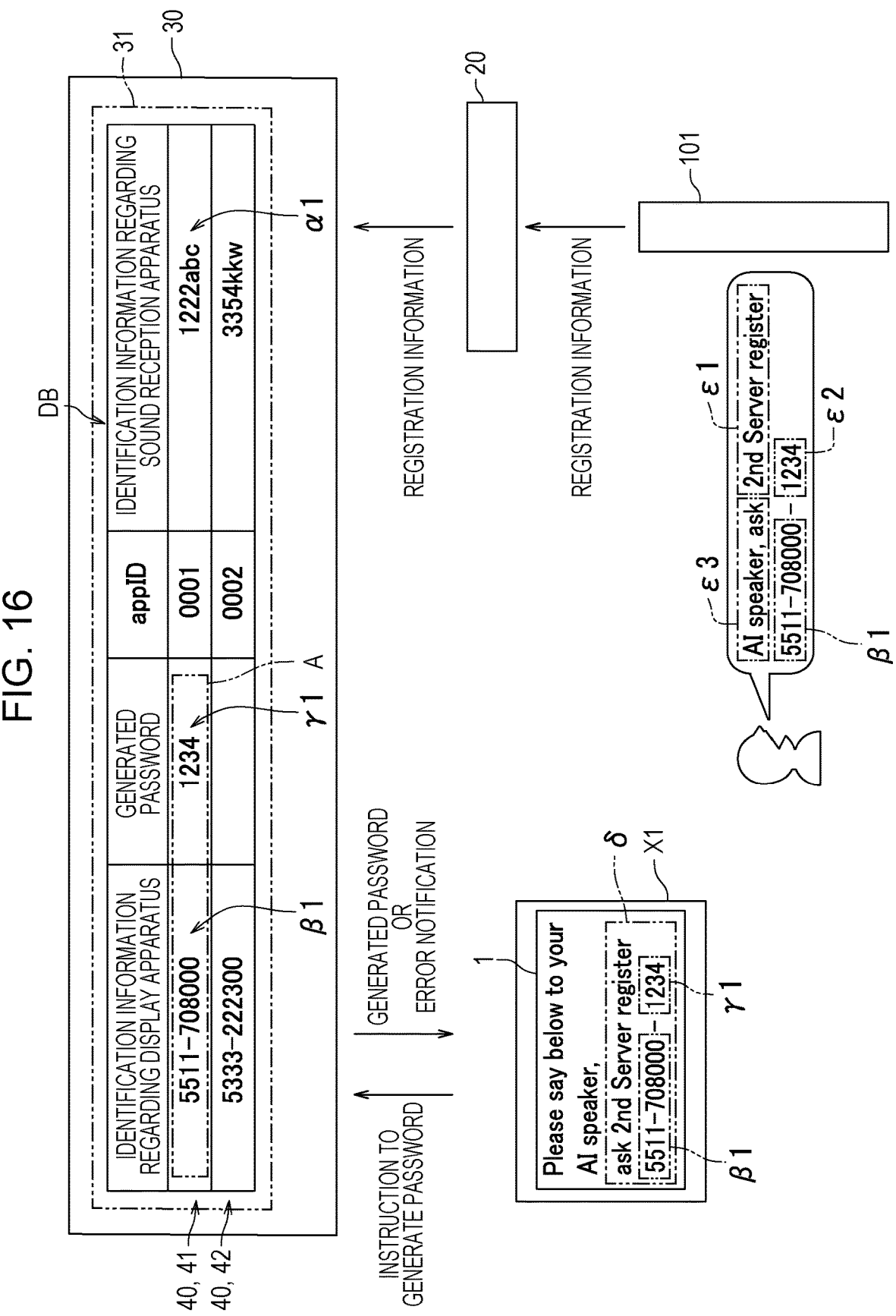

INFORMATION PROCESSING SYSTEM, SERVER, AND METHOD FOR GENERATING ASSOCIATION INFORMATION

BACKGROUND

1. Field

The present disclosure relates to an information processing system, a server, and a method for generating association information.

2. Description of the Related Art

In an information processing system described in Japanese Unexamined Patent Application Publication No. 2013-178726, a multifunction peripheral (MFP) generates a one-time password whose valid period is limited to a period relating to printing. The MFP then displays the one-time password and a service set identifier (SSID) on a display unit. A communication terminal apparatus receives the SSID and the one-time password and gets connected to the MFP. As a result, the communication terminal apparatus transmits image data to the MFP.

SUMMARY

An information processing system including an artificial intelligence (AI) speaker (reception apparatus) operates using a cloud server and achieves various functions in combination with a web service. The information processing system including the AI speaker, for example, achieves a sound control function, which is used to control an electronic apparatus through speech sound.

In order to achieve the sound control function, however, the AI speaker and the electronic apparatus are supposed to be associated with each other in advance. In order to associate the AI speaker and the electronic apparatus with each other, for example, a user registers himself/herself in a web service and a server to be used. The user then installs an application relating to the association on a mobile terminal such as a mobile application. The user lastly operates the mobile terminal to associate the electronic apparatus and the AI speaker.

The present disclosure provides an information processing system, a server, and a method for generating association information capable of easily associating an electronic apparatus and a reception apparatus with each other.

According to an aspect of the disclosure, there is provided an information processing system including a reception apparatus that receives an instruction for an electronic apparatus, a first server that generates data corresponding to the instruction received by the reception apparatus, and a second server that generates a control command for the electronic apparatus corresponding to the data and that transmits the control command to the electronic apparatus. The reception apparatus includes an input unit that receives an input password and a transmission unit that transmits the input password and identification information regarding the reception apparatus. The second server includes a first reception unit that receives identification information regarding the electronic apparatus, a transmission unit that transmits a password generated in accordance with the identification information regarding the electronic apparatus to an output unit capable of outputting the generated password, a second reception unit that receives the input password and the identification information regarding the reception apparatus, a determination unit that determines whether the input password and the generated password match, and an information generation unit that generates, on a basis of a result of the determination made by the determination unit, association information by associating the identification information regarding the electronic apparatus and the identification information regarding the reception apparatus with each other.

According to an aspect of the disclosure, there is provided a server included in an information processing system including a reception apparatus that receives an instruction for an electronic apparatus, a first server that generates data corresponding to the instruction received by the reception apparatus, and a second server that generates a control command for the electronic apparatus corresponding to the data and that transmits the control command to the electronic apparatus. The second server, which is the server, includes a first reception unit that receives identification information regarding the electronic apparatus, a transmission unit that transmits a password generated in accordance with the identification information regarding the electronic apparatus to an output unit capable of outputting the generated password, a second reception unit that receives an input password and identification information regarding the reception apparatus transmitted from the reception apparatus, a determination unit that determines whether the input password and the generated password match, and an information generation unit that generates, on a basis of a result of the determination made by the determination unit, association information by associating the identification information regarding the electronic apparatus and the identification information regarding the reception apparatus with each other.

According to an aspect of the disclosure, there is provided a method for generating association information used by an information processing system including a reception apparatus that receives an instruction for an electronic apparatus, a first server that generates data corresponding to the instruction received by the reception apparatus, and a second server that generates a control command for the electronic apparatus corresponding to the data and that transmits the control command to the electronic apparatus. The method includes receiving, using the second server, identification information regarding the electronic apparatus, transmitting, using the second server, a password generated in accordance with the identification information regarding the electronic apparatus to an output unit capable of outputting the generated password, outputting, using the output unit, the generated password, receiving, using the reception apparatus, an input password, transmitting, using the reception apparatus, the input password and identification information regarding the reception apparatus, receiving, using the second server, the input password and the identification information regarding the reception apparatus, determining, using the second server, whether the input password and the generated password match, and generating, using the second server on a basis of a result of the determining performed using the determination unit, association information by associating the identification information regarding the electronic apparatus and the identification information regarding the reception apparatus with each other.

BRIEF DESCRIPTION OF THE DRAWINGS

FIG. 6 is a diagram illustrating a database;

FIG. 16 is a diagram illustrating determination information according to a modification;

DESCRIPTION OF THE EMBODIMENTS

Figure 1:
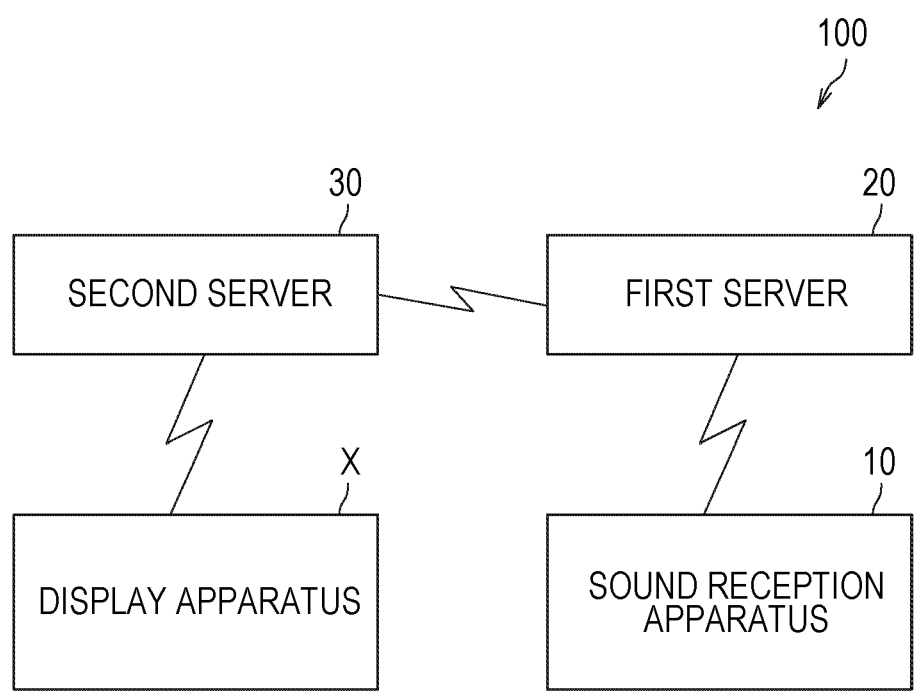
FIG. 1 is a block diagram illustrating an information processing system according to an embodiment of the present disclosure.

An embodiment of the present disclosure will be described with reference to the drawings. The same or equivalent components are given the same reference numerals in the drawings, and description thereof is not repeated.

An information processing system 100 according to an embodiment of the present disclosure will be described with reference to FIG. 1. FIG. 1 is a block diagram illustrating the information processing system 100 according to the embodiment of the present disclosure.

As illustrated in FIG. 1, the information processing system 100 is a system in which an electronic apparatus is controlled through speech sound. The electronic apparatus in the present embodiment is a display apparatus X.

The information processing system 100 includes a sound reception apparatus 10, a first server 20, and a second server 30.

The sound reception apparatus 10 receives a speech sound indicating an instruction for the display apparatus X. The sound reception apparatus 10 then transmits sound data regarding the received speech sound to the first server 20.

The sound reception apparatus 10 is an example of a reception apparatus in the present disclosure.

The first server 20 converts the sound data received from the sound reception apparatus 10 into text data and generates an intent corresponding to the obtained text data. The intent is data corresponding to the speech sound received by the sound reception apparatus 10. More specifically, the intent is text data indicating a meaning of the speech sound received by the sound reception apparatus 10. The second server 30 receives the intent from the first server 20. The second server 30 generates a control command for the display apparatus X corresponding to the intent. The second server 30 then transmits the control command to the display apparatus X.

In other words, the control command for the display apparatus X corresponding to the intent is obtained by converting the instruction for the display apparatus X received by the sound reception apparatus 10 into a signal of a control command for the display apparatus X.

The display apparatus X receives the control command generated by the second server 30 and operates on the basis of the received control command.

As described with reference to FIG. 1, the display apparatus X is controlled by a speech sound received by the sound reception apparatus 10. As a result, a user can cause the display apparatus X to perform a certain operation by uttering a speech sound indicating the certain operation to the sound reception apparatus 10. The certain operation is, for example, an operation for causing the display apparatus X to execute a print job.

Figure 2:
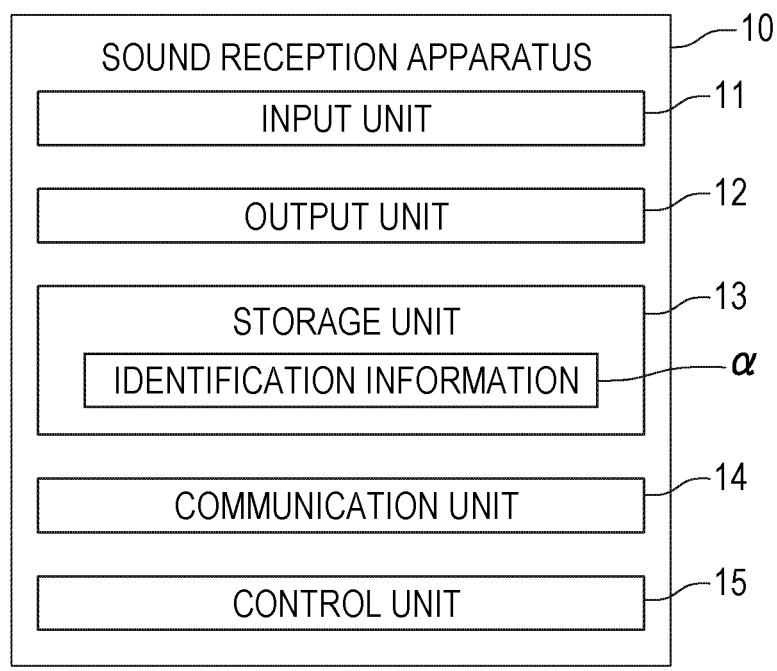
FIG. 2 is a block diagram illustrating a sound reception apparatus.

Next, the sound reception apparatus 10 will be described with reference to FIG. 2. FIG. 2 is a block diagram illustrating the sound reception apparatus 10.

As illustrated in FIG. 2, the sound reception apparatus 10 is an apparatus capable of receiving speech sound. Examples of the apparatus capable of receiving speech sound include Amazon Echo (registered trademark) developed by Amazon and Google Home (registered trademark) developed by Google.

The sound reception apparatus 10 includes an input unit 11, an output unit 12, a storage unit 13, a communication unit 14, and a control unit 15.

The input unit 11 receives sound such as speech sound. The input unit 11 may include, for example, a microphone.

The output unit 12 outputs sound such as speech sound. The output unit 12 may include, for example, a speaker.

The storage unit 13 includes storage devices (e.g., semiconductor memories) such as a read-only memory (ROM) and a random-access memory (RAM) and may further include an auxiliary storage device (e.g., a hard disk drive). The storage unit 13 stores various computer programs executed by the control unit 15.

The storage unit 13 stores identification information α regarding the sound reception apparatus 10. The identification information α regarding the sound reception apparatus 10 is, for example, an identification (ID) number of the sound reception apparatus 10. The identification information α regarding the sound reception apparatus 10 indicates a code assigned to each of a plurality of sound reception apparatuses 10 so that the plurality of sound reception apparatuses 10 can be distinguished from one another. The code at least includes, for example, characters such as Japanese or English alphabets, numbers, a barcode, or a mark.

The communication unit 14 communicates with the first server 20 through a network such as a local area network (LAN). The communication unit 14 is a communication module (communication device) such as a LAN board. The communication unit 14 is an example of a transmission unit of the reception apparatus in the present disclosure.

The control unit 15 includes a processor such as a central processing unit (CPU) or a microprocessing unit (MPU). The control unit 15 controls the other components of the sound reception apparatus 10 by executing the computer programs stored in the storage unit 13.

Figure 3:
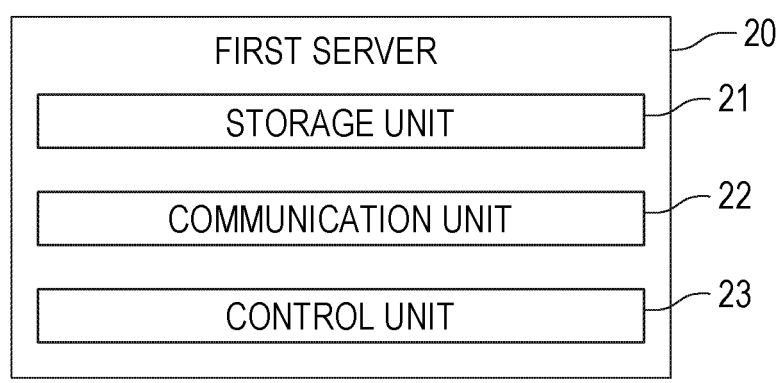
FIG. 3 is a block diagram illustrating a first server.

Next, the first server 20 will be described with reference to FIG. 3. FIG. 3 is a block diagram illustrating the first server 20.

As illustrated in FIG. 3, for example, the first server 20 is a server having a function of analyzing and recognizing a speech sound received by the sound reception apparatus 10. Examples of the server include Alexa (registered trademark) developed by Amazon and Google Assistant developed by Google.

The first server 20 includes a storage unit 21, a communication unit 22, and a control unit 23.

The storage unit 21 includes storage devices such as a ROM and a RAM and may further include an auxiliary storage device. The storage unit 21 stores various computer programs executed by the control unit 23.

The communication unit 22 communicates with the sound reception apparatus 10 and the second server 30 through a network such as a LAN. The communication unit 22 is a communication module such as a LAN board.

The first server 20 may be connected to the sound reception apparatus 10 and/or the second server 30 by wire, instead.

The control unit 23 includes a processor such as a CPU or an MPU. The control unit 15 controls the other components of the first server 20 by executing the computer programs stored in the storage unit 21.

Figure 4:
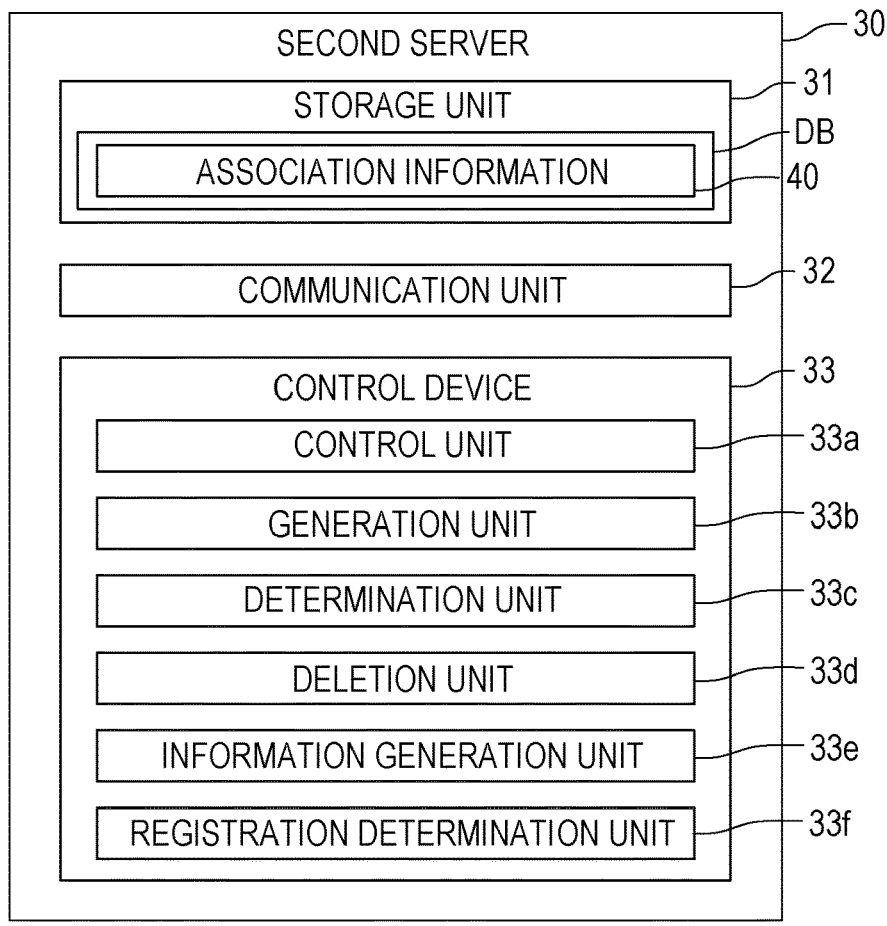
FIG. 4 is a block diagram illustrating a second server.

The second server 30 will be described with reference to FIG. 4. FIG. 4 is a block diagram illustrating the second server 30.

As illustrated in FIG. 4, the second server 30 includes a storage unit 31, a communication unit 32, and a control device 33.

The storage unit 31 includes storage devices such as a ROM and a RAM and may further include an auxiliary storage device. The storage unit 31 stores various computer programs executed by the control device 33.

The storage unit 31 stores a database DB. The database DB includes association information 40. The association information 40 will be described later with reference to FIG. 6.

The communication unit 32 communicates with the second server 30 and display apparatuses X through a network such as a LAN. The communication unit 32 is a communication module such as a LAN board.

The communication unit 32 is an example of a transmission unit in the present disclosure. The communication unit 32 is an example of a first reception unit in the present disclosure. The communication unit 32 is also an example of a second reception unit in the present disclosure.

The control device 33 includes a processor such as a CPU or an MPU. The control device 33 controls the other components of the second server 30 by executing the computer programs stored in the storage unit 31.

The control device 33 includes a control unit 33a, a generation unit 33b, a determination unit 33c, a deletion unit 33d, an information generation unit 33e, and a registration determination unit 33f. More specifically, the processor of the control device 33 functions as the control unit 33a, the generation unit 33b, the determination unit 33c, the deletion unit 33d, the information generation unit 33e, and the registration determination unit 33f by executing the computer programs stored in the storage unit 31.

Figure 5:
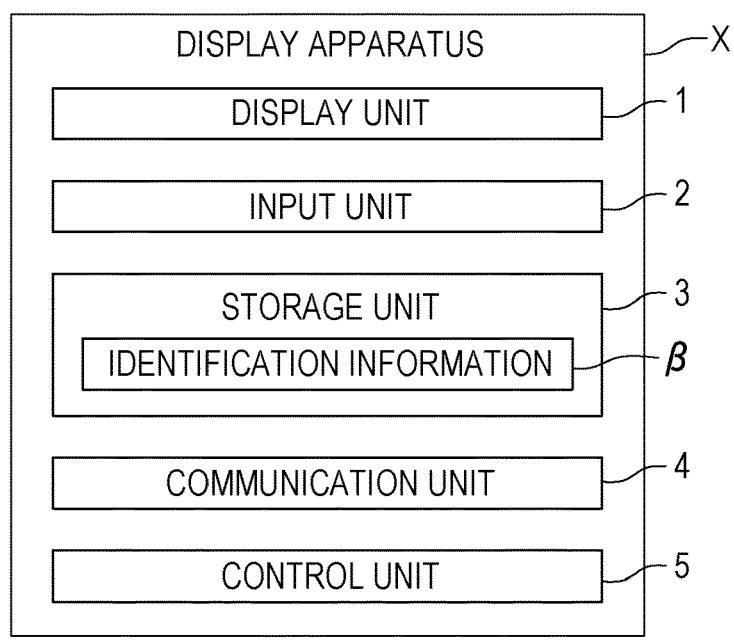
FIG. 5 is a block diagram illustrating a display apparatus.

Next, the display apparatus X will be described with reference to FIG. 5. FIG. 5 is a block diagram illustrating the display apparatus X.

As illustrated in FIG. 5, the display apparatus X includes a display unit 1, an input unit 2, a storage unit 3, a communication unit 4, and a control unit 5.

The display unit 1 is, for example, a liquid crystal display. The display apparatus X may be an electroluminescent (EL) display or a plasma display pane; (PDP), instead.

The input unit 2 is, for example, a remote control communicable with the control unit 5, operation keys provided on a body of the display apparatus X, or a touch panel provided for the display unit 1.

The storage unit 3 includes storage devices such as a ROM and a RAM and may further include an auxiliary storage device. The storage unit 3 stores various computer programs executed by the control unit 5.

The storage unit 3 stores identification information $\beta$ regarding display apparatuses X. The identification information $\beta$ regarding the display apparatuses X is, for example, ID numbers of the display apparatuses X. The identification information $\beta$ regarding the display apparatuses X is codes assigned to the display apparatuses X so that the display apparatuses X can be distinguished from one another.

The communication unit 4 communicates with the second server 30 through a network such as a LAN. The communication unit 4 is a communication module such as a LAN board.

The display apparatus X may be connected to the second server 30 by wire, instead.

The control unit 5 includes a processor such as a CPU or an MPU. The control unit 5 controls the other components of the display apparatus X by executing the computer programs stored in the storage unit 3.

The association information 40 (refer to FIG. 4) will be described with reference to FIGS. 6 to 7B. FIG. 6 is a diagram illustrating the database DB.

The database DB includes a plurality of pieces of association information 40. The plurality of pieces of association information 40 are identification information $\alpha$ regarding a plurality of sound reception apparatuses 10 and the identification information $\beta$ regarding the plurality of display apparatuses X associated with each other.

As illustrated in FIG. 6, each of the plurality of pieces of association information 40 is identification information $\alpha$ regarding a sound reception apparatus 10 and identification information $\beta$ regarding a display apparatus X associated with each other. In each of the plurality of pieces of association information 40, a generated password and appID are also associated with the identification information $\alpha$ regarding the sound reception apparatus 10 and the identification information $\beta$ regarding the display apparatus X. The generated password will be described later. appID is an identifier set for each of the plurality of pieces of association information 40.

The plurality of pieces of association information 40 include first association information 41 and second association information 42. The plurality of sound reception apparatuses 10 include a first sound reception apparatus 101 and a second sound reception apparatus 102. The plurality of display apparatuses X include a first display apparatus X1 and a second display apparatus X2.

The first association information 41 is identification information $\alpha 1$ regarding the first sound reception apparatus 101 and identification information β1 regarding the first display apparatus X1 associated with each other. The second association information 42 is identification information α2 regarding the second sound reception apparatus 102 and identification information β2 regarding the second display apparatus X2 associated with each other.

Figure 7A:
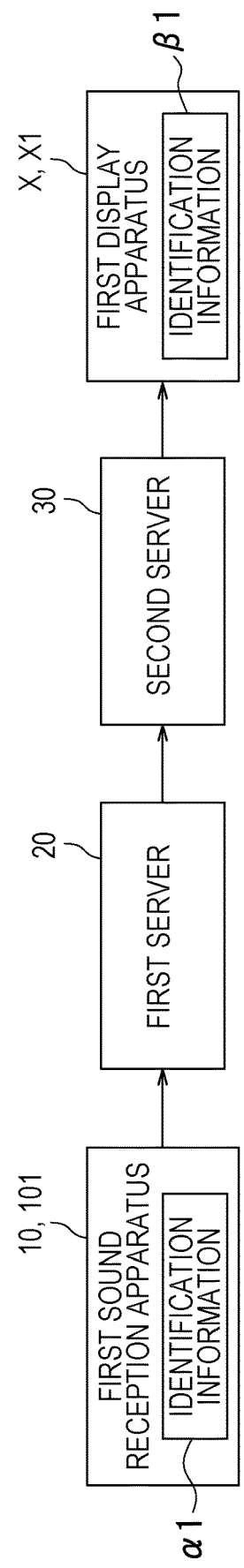
FIG. 7A is a diagram illustrating a procedure of a first instruction transferred from a first sound reception apparatus to a first display apparatus.

A procedure of a first instruction transferred from the first sound reception apparatus 101 to the first display apparatus X1 will be described with reference to FIGS. 6 and 7A. FIG. 7A is a diagram illustrating the procedure of the first instruction transferred from the first sound reception apparatus 101 to the first display apparatus X1.

As illustrated in FIGS. 6 and 7A, first, the first sound reception apparatus 101 receives the first instruction for the first display apparatus X1. The first instruction is then transmitted to the second server 30 through the first server 20 along with the identification information α1 regarding the first sound reception apparatus 101. The control unit 33a of the second server 30 calculates the identification information β1 regarding the first display apparatus X1 on the basis of the identification information α1 regarding the first sound reception apparatus 101 and the first association information 41. The control unit 33a of the second server 30 then transmits the first instruction to the first display apparatus X1 in accordance with, for example, polling (transmission request) from the first display apparatus X1. Alternatively, message queuing telemetry transport (MQTT) may be used by the control unit 33a of the second server 30 as a communication protocol for transmitting the first instruction to the first display apparatus X1.

A procedure of a second instruction transferred from the second sound reception apparatus 102 to the second display apparatus X2 will be described with reference to FIGS. 6 and 7B. FIG. 7B is a diagram illustrating the procedure of the second instruction transferred from the second sound reception apparatus 102 to the second display apparatus X2.

Figure 7B:
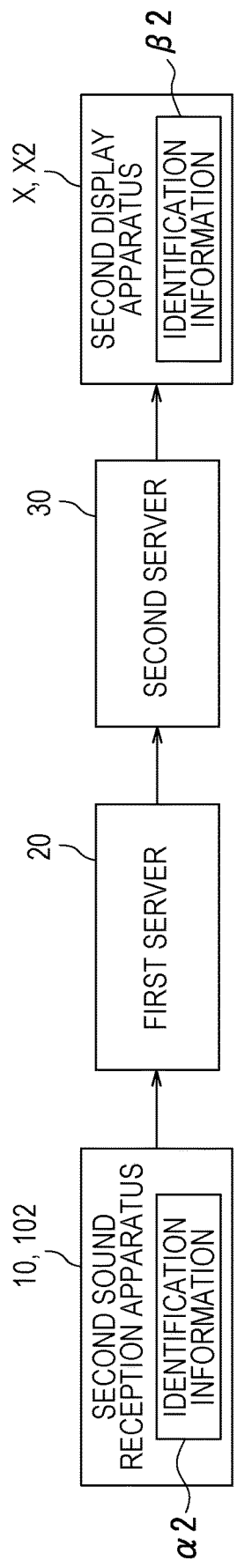
FIG. 7B is a diagram illustrating a procedure of a second instruction transferred from a second sound reception apparatus to a second display apparatus.

As illustrated in FIGS. 6 and 7B, the control unit 33a of the second server 30 calculates the identification information β2 regarding the second display apparatus X2 on the basis of the identification information α2 regarding the second sound reception apparatus 102 and the second association information 42. The control unit 33a of the second server 30 then identifies an Internet protocol (IP) address of the second display apparatus X2 on the basis of the identification information β2. As a result, the second instruction is transferred from the second sound reception apparatus 102 to the second display apparatus X2 through the first server 20 and the second server 30.

As described with reference to FIGS. 6 to 7B, an instruction received by the sound reception apparatus 10 can be transmitted to a certain display apparatus X on the basis of the association information 40 in the information processing system 100.

Next, a process for generating the first association information 41 (refer to FIG. 6) will be described with reference to FIGS. 8 to 15C. The process for generating the first association information 41 is a process for generating the first association information 41.

The process for generating the first association information 41 includes first and second processes. The second process is performed after the first process is completed.

Figure 8:
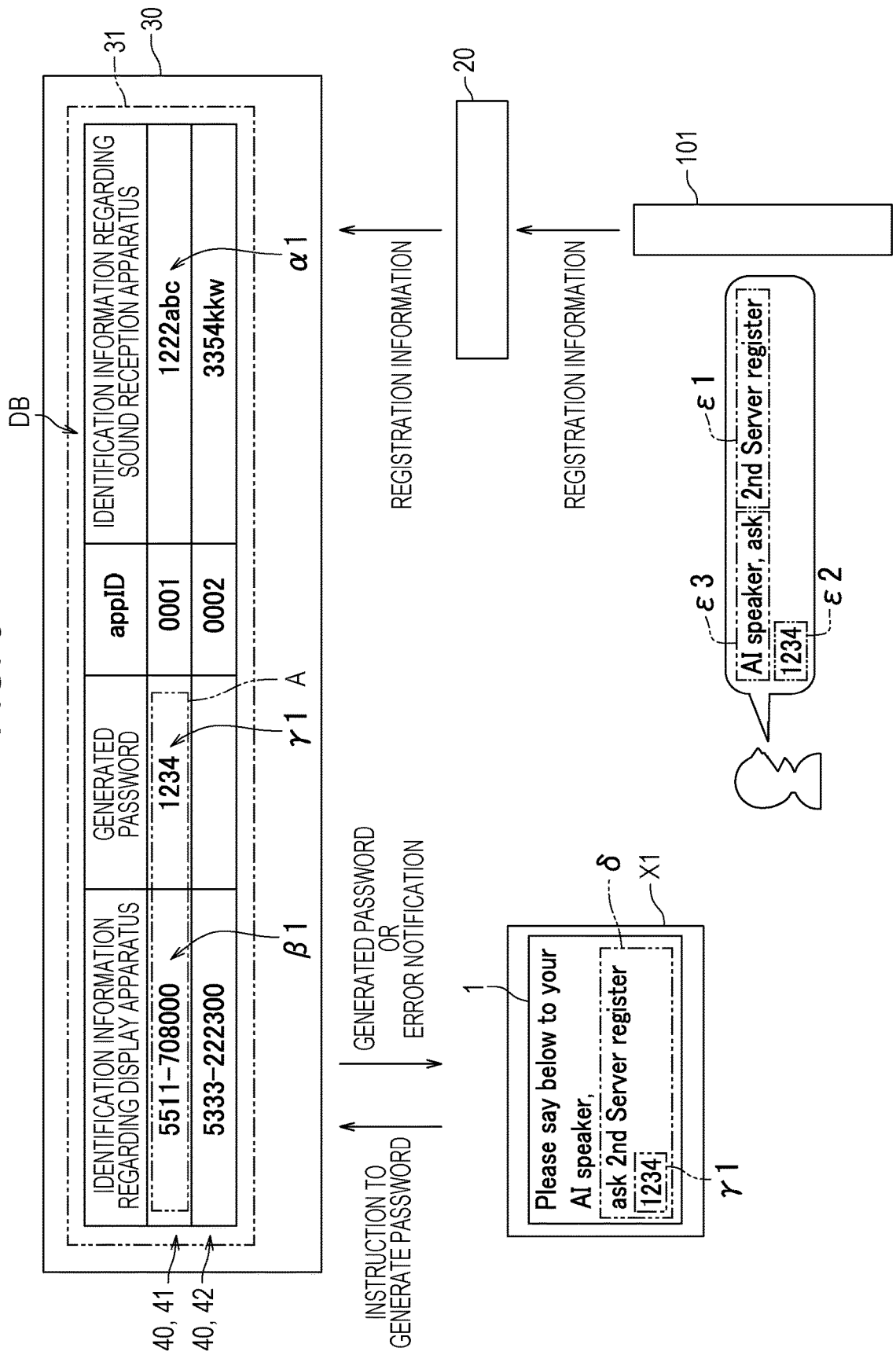
FIG. 8 is a first schematic diagram illustrating a process for generating first association information.
Figure 9:
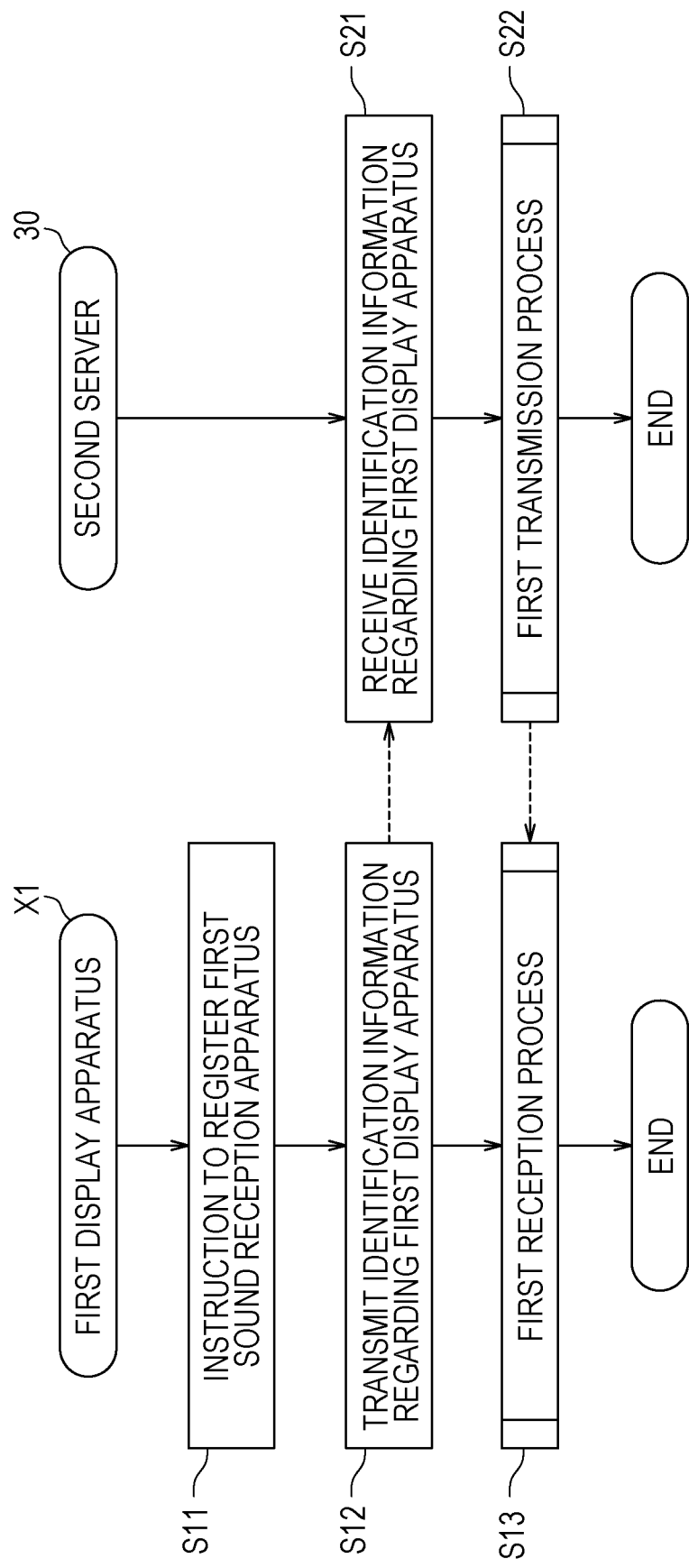
FIG. 9 is a flowchart illustrating a first process.

First, the first process will be described with reference to FIGS. 8 to 11 and 14A to 14C. FIG. 8 is a first schematic diagram illustrating the process for generating the first association information 41. FIG. 9 is a flowchart illustrating the first process.

As illustrated in FIGS. 8 and 9, in step S11, the input unit 2 of the first display apparatus X1 receives an instruction to register the first sound reception apparatus 101. The instruction to register the first display apparatus X1 is an instruction for the second server 30 to start a process for associating the first display apparatus X1 and the first sound reception apparatus 101 with each other.

Figure 14A:
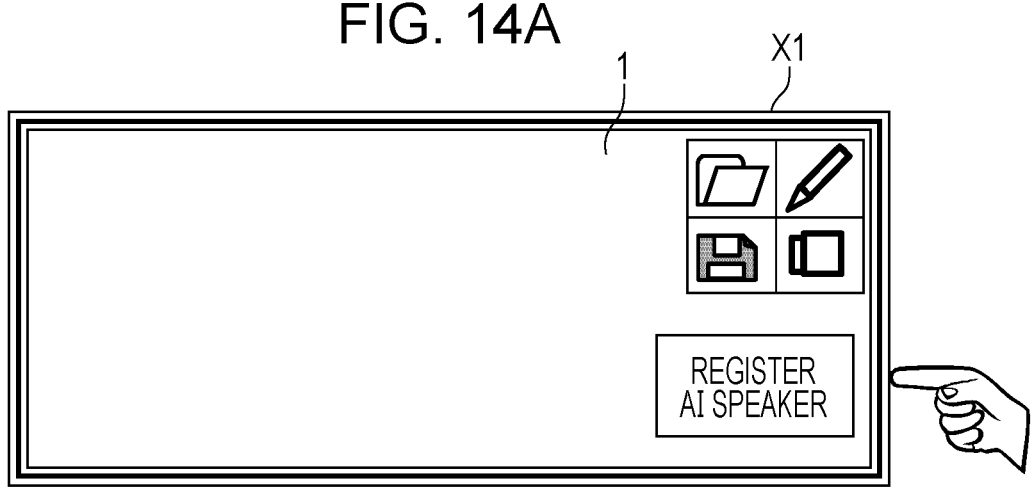
FIG. 14A is a diagram illustrating an example of a screen displayed on a display unit when an instruction to register the first sound reception apparatus has been received.

FIG. 14A is a diagram illustrating an example of a screen displayed on the display unit 1 when the instruction to register the first sound reception apparatus 101 has been received.

In the screen displayed on the display unit 1 illustrated in FIG. 14A, "AI speaker" is an example of the first sound reception apparatus 101. For example, the user moves a cursor using the input unit 2 and selects an image of "Register AI speaker" displayed on the display unit 1. As a result, the input unit 2 receives the instruction to register the first sound reception apparatus 101.

As illustrated in FIGS. 8 and 9, in step S12, the control unit 5 of the first display apparatus X1 controls the communication unit 4 such that the communication unit 4 transmits the identification information β1 regarding the first display apparatus X1 to the second server 30.

When the input unit 2 of the first display apparatus X1 has received an instruction to generate a password, therefore, the first display apparatus X1 transmits the identification information β1 regarding the first display apparatus X1 to the second server 30. At this time, the first display apparatus X1 also transmits a password generation command to the second server 30. The password generation command is a control command indicating the instruction to generate a password.

In step S21, the communication unit 32 of the second server 30 receives the identification information β1 regarding the first display apparatus X1. The communication unit 32 also receives the password generation command.

In step S22, the second server 30 executes the password generation command to perform a first transmission process. As a result, a process performed by the second server 30 ends.

In step S13, the first display apparatus X1 performs a first reception process. As a result, a process performed by the display apparatus X ends.

Figure 10:
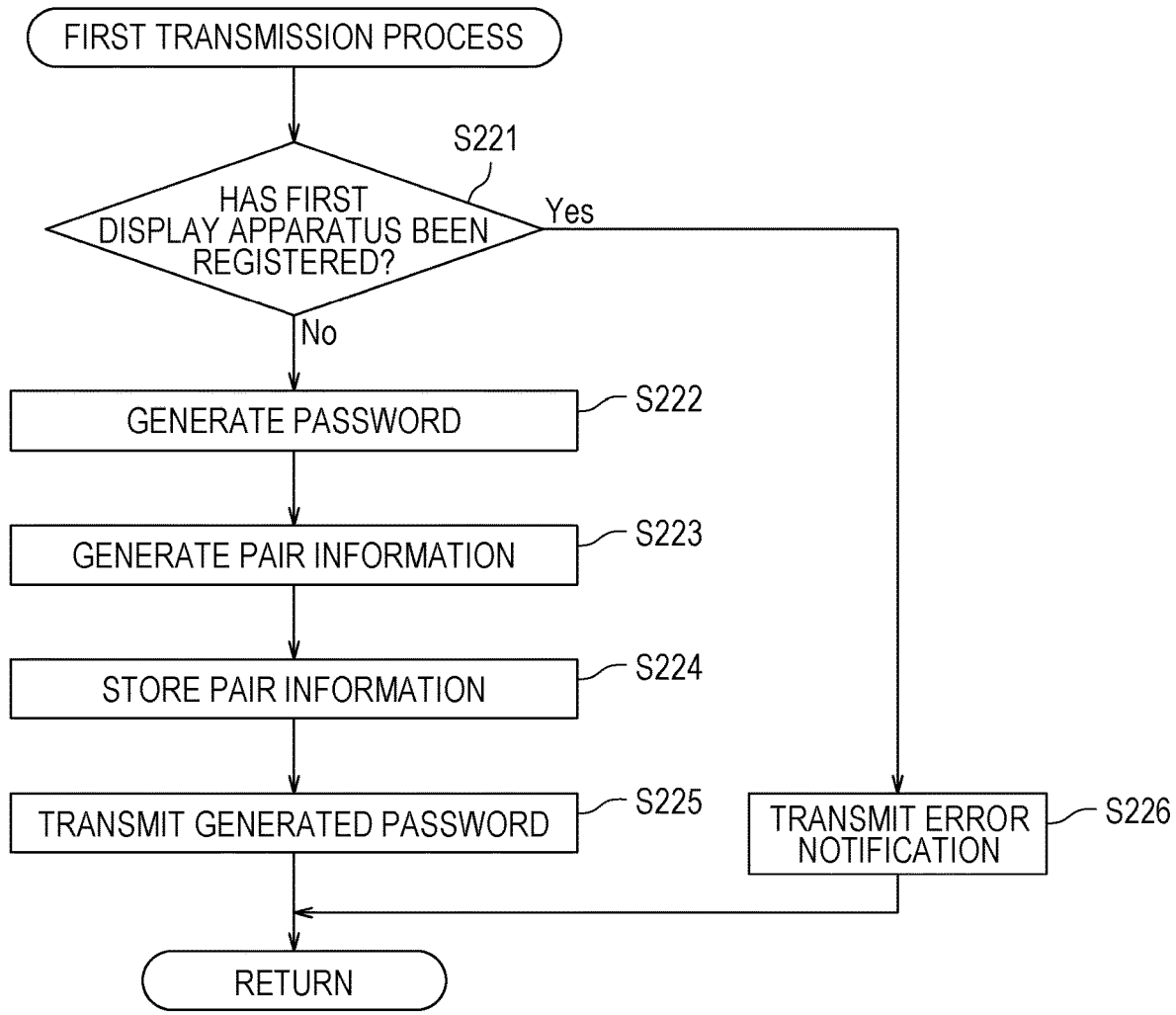
FIG. 10 is a flowchart illustrating a first transmission process.

Next, the first transmission process in step S22 (refer to FIG. 9) will be described with reference to FIGS. 8 and 10. FIG. 10 is a flowchart illustrating the first transmission process.

As illustrated in FIGS. 8 and 10, in step S221, the registration determination unit 33f of the second server 30 determines whether the first display apparatus X1 has been registered in the second server 30. When the first display apparatus X1 has been registered in the second server 30, registration information regarding the first display apparatus X1 has been generated and exists in the database DB. The registration information regarding the first display apparatus X1 is the identification information β1 regarding the first display apparatus X1 and a piece of the identification information α regarding the plurality of sound reception apparatuses 10 associated with each other.

If the first display apparatus X1 has not been registered (NO in step S211), the process proceeds to step S222. If the first display apparatus X1 has been registered (YES in step S211), on the other hand, the process proceeds to step S226.

In step S222, the generation unit 33b generates a password γ1. The password γ1 is generated for the identification information β1 regarding the first display apparatus X1.

In step S223, the generation unit 33b generates pair information A. The pair information A is the identification information β1 regarding the first display apparatus X1 and the generated password γ1 associated with each other.

In step S224, the generation unit 33b adds the pair information A to the database DB. As a result, the pair information A is stored in the storage unit 31.

In step S225, the control unit 33a controls the communication unit 32 such that the communication unit 32 transmits the generated password γ1 to the first display apparatus X1. As a result, the second server 30 transmits the generated password γ1 to the first display apparatus X1. When the second server 30 has transmitted the generated password γ1, the first transmission process ends.

In the present embodiment, the generated password γ1 is a one-time password. When a certain period of time has elapsed since the generation unit 33b generated the password γ1, therefore, the deletion unit 33d deletes the generated password γ1 from the database DB. As a result, the generated password γ1 no longer exists in the pair information A.

In step S226, the control unit 33a controls the communication unit 32 such that the communication unit 32 transmits an error notification to the first display apparatus X1. As a result, the second server 30 transmits an error notification to the first display apparatus X1. When the second server 30 has transmitted the error notification, the first transmission process ends.

Figure 11:
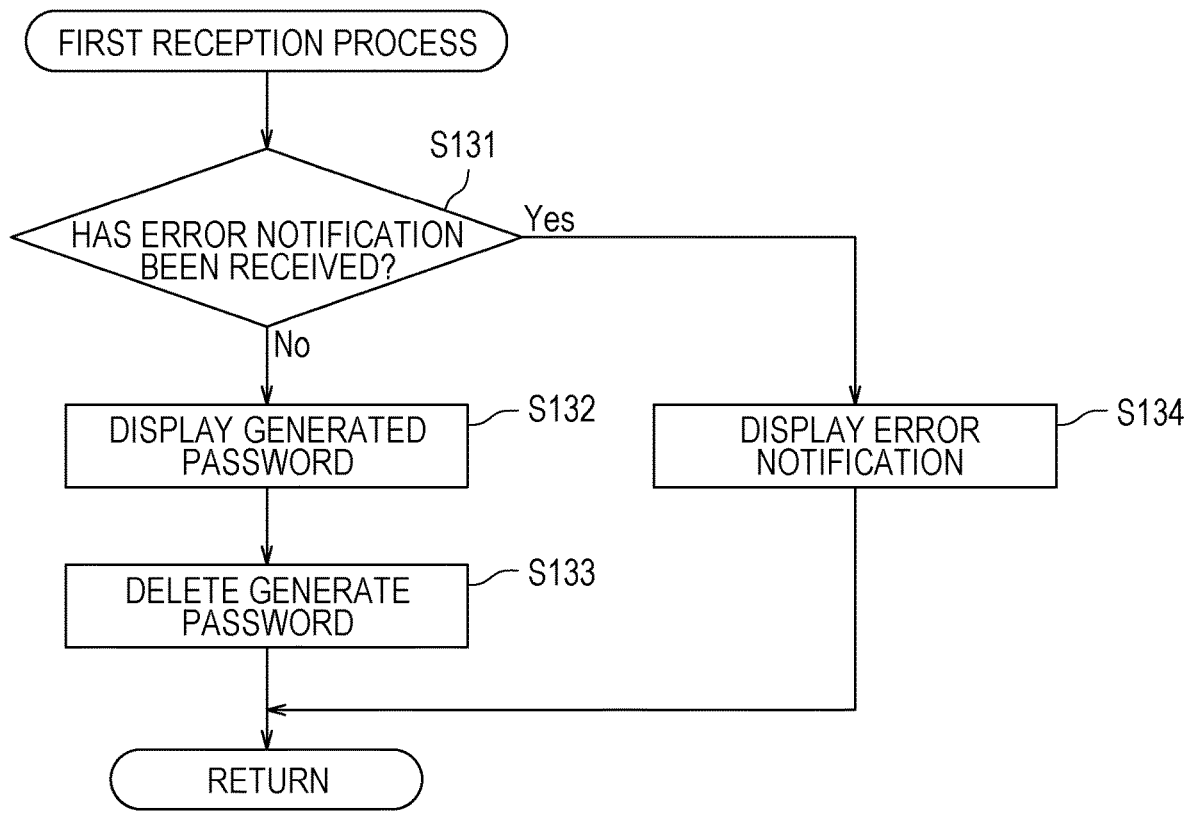
FIG. 11 is a flowchart illustrating a first reception process.

Next, the first reception process will be described with reference to FIGS. 8, 11, 14B, 14C, and 15A. FIG. 11 is a flowchart illustrating the first reception process.

As illustrated in FIGS. 8 and 11, in step S131, the control unit 5 of the first display apparatus X1 determines whether the communication unit 4 has received an error notification.

If the communication unit 4 has not received an error notification (NO in step S131), the process proceeds to step S132. In other words, if the communication unit 4 has received the generated password γ1, the process proceeds to step S132. If the communication unit 4 has received an error notification (YES in step S131), on the other hand, the process proceeds to step S134.

In step S132, the control unit 5 of the first display apparatus X1 controls the display unit 1 such that the display unit 1 displays the generated password γ1. The display unit 1 thus displays the generated password γ1. As a result, the user can see the generated password γ1 on the display unit 1.

The display unit 1 displays all information δ that the user is to utter to the first sound reception apparatus 101. For example, the display unit 1 displays the identification information β1 regarding the first display apparatus X1 and the generated password γ1. The display unit 1, however, may display at least the generated password γ1.

The display unit 1 of the first display apparatus X1 is an example of an output unit in the present disclosure. The display unit 1 is capable of outputting the generated password γ1.

Figure 14B:
FIG. 14B is a diagram illustrating an example of a screen displayed on the display unit when the display unit displays a generated password.

FIG. 14B is a diagram illustrating an example of a screen displayed on the display unit 1 when the display unit 1 displays the generated password γ1. In FIG. 14B, the generated password γ1 is "registration number 5511-708000-1234".

The output unit in the present disclosure may be any device capable of notifying a user who associates the first display apparatus X1 and the first sound reception apparatus 101 with each other of the generated password γ1.

If a terminal such as a mobile terminal or a personal computer (PC) is communicably connected to the display apparatus X, for example, a display of the terminal may display the generated password γ1. In this case, the display of the terminal functions as a second example of the output unit in the present disclosure. Alternatively, a speaker of the terminal may output a sound indicating the generated password γ1. In this case, the speaker of the terminal functions as a third example of the output unit in the present disclosure.

Alternatively, an image forming apparatus communicably connected to the second server 30 may print an image indicating the generated password γ1 or an image indicating the information δ on a sheet of paper. In this case, the image forming apparatus functions as a fourth example of the output unit in the present disclosure.

When the display unit 1 of the first display apparatus X1 has displayed the generated password γ1, the first reception process ends.

In step S133, the deletion unit 33d deletes the generated password γ1 from the database DB when a certain period of time has elapsed since the generation unit 33b generated the password γ1.

Figure 14C:
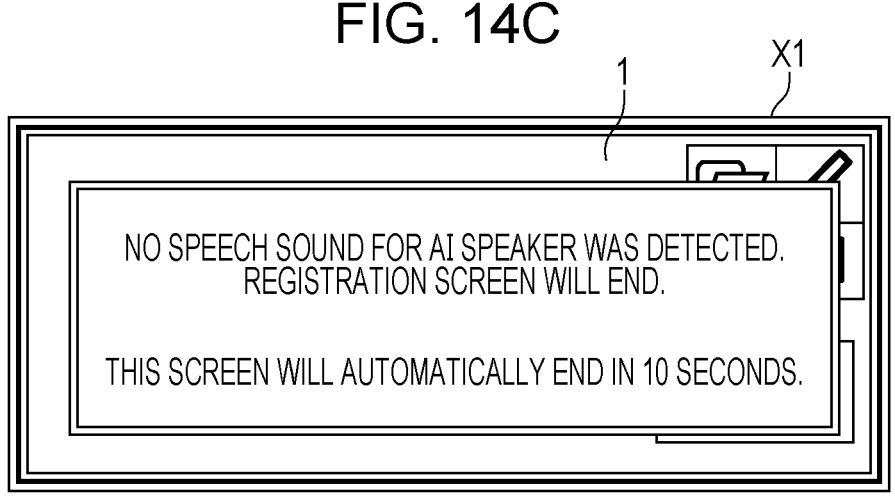
FIG. 14C is a diagram illustrating an example of a screen displayed on the display unit immediately before a deletion unit deletes the generated password from a database.

FIG. 14C is a diagram illustrating an example of a screen displayed on the display unit 1 immediately before the deletion unit 33d deletes the generated password γ1 from the database DB. As illustrated in FIG. 14C, the image indicating the generated password γ1 illustrated in FIG. 14B is deleted from the display unit 1 when the certain period of time has elapsed without a speech sound being input to the sound reception apparatus 10. In addition, when the certain period of time has elapsed, the deletion unit 33d deletes the generated password γ1 from the database DB. The process for generating the first association information 41 thus ends.

In step S134, if the first display apparatus X1 has been registered in the second server 30, the control unit 5 of the first display apparatus X1 controls the display unit 1 (refer to FIG. 5) such that the display unit 1 displays the error notification. The display unit 1 thus displays the error notification. As a result, the user can see the error notification on the display unit 1. The error notification indicates that the registration of the first display apparatus X1 has failed. The control unit 5 then performs an ending process. The ending process is a process for ending the process for generating the first association information 41.

Alternatively, if the first display apparatus X1 has been registered in the second server 30, the control unit 33a of the second server 30 may perform a deletion process. The deletion process is a process for deleting the sound reception apparatus 10 associated with the first display apparatus X1 from the database DB. As a result, the process for generating the first association information 41 can be started again smoothly.

Alternatively, if the first display apparatus X1 has been registered in the second server 30, the generation unit 33b of the second server 30 may perform a re-registration process. The re-registration process is a process for deleting the sound reception apparatus 10 associated with the first display apparatus X1 from the database DB and generating the password γ1. If the re-registration process is performed, therefore, step S222 and later steps (refer to FIG. 10) continue.

The user may select, using the input unit 2, which of the ending process, the deletion process, and the re-registration process the control device 33 of the second server 30 is to perform.

Figure 15A:
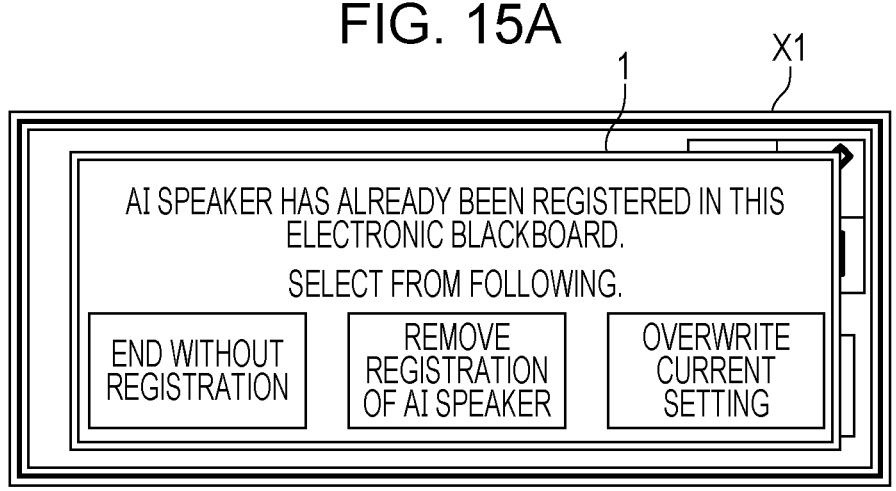
FIG. 15A is a diagram illustrating a screen displayed on the display unit when a user selects an ending process, a deletion process, or a re-registration process using an input unit.

FIG. 15A is a diagram illustrating a screen displayed on the display unit 1 when the user selects the ending process, the deletion process, or the re-registration process using the input unit 2. In FIG. 15A, an image of "End without registration" is an image for selecting the ending process. An image of "Remove registration of AI speaker" is an image for selecting the deletion process. An image of "Overwrite current setting" is an image for selecting the re-registration process.

Figure 12:
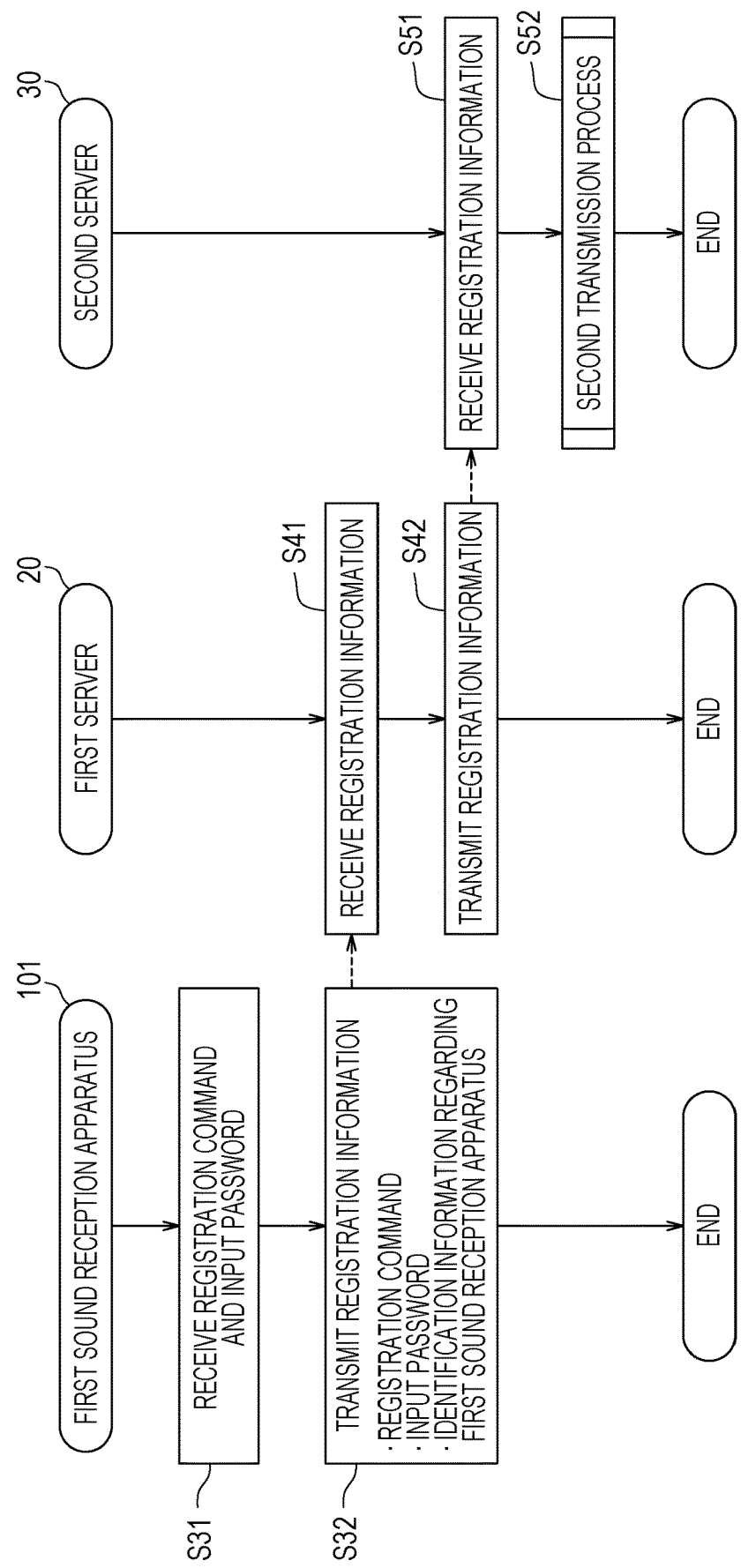
FIG. 12 is a flowchart illustrating a second process.

Next, the second process will be described with reference to FIGS. 8, 12, and 13. FIG. 12 is a flowchart illustrating the second process.

As illustrated in FIGS. 8 and 12, in step S31, the input unit 11 of the first sound reception apparatus 101 receives a speech sound indicating a registration command ε1 and a speech sound indicating an input password ε2.

The registration command ε1 is used to register the first display apparatus X1 in the second server 30. In other words, the registration command ε1 is used to generate the association information 40.

The password ε2 is input by the user to the first sound reception apparatus 101 on the basis of the generated password γ1 displayed on the display unit 1.

The input unit 11 of the first sound reception apparatus 101 also receives a speech sound indicating an activation phrase ε3. The activation phrase ε3 is used to activate the first sound reception apparatus 101.

The input unit 11 may be an input device such as a keyboard or a touch panel. The user may input the registration command ε1, the input password ε2, and the activation phrase ε3 using the input device.

In step S32, the control unit 15 of the first sound reception apparatus 101 controls the communication unit 14 such that the communication unit 14 transmits sound data regarding registration information to the first server 20. As a result, the first sound reception apparatus 101 transmits the sound data regarding the registration information to the first server 20.

The registration information includes the registration command ε1, the input password ε2, and the identification information α1 regarding the first sound reception apparatus 101.

In step S41, the communication unit 22 of the first server 20 receives the sound data regarding the registration information. The control unit 23 of the first server 20 converts the sound data regarding the registration information into text data.

In step S42, the control unit 23 of the first server 20 controls the communication unit 22 such that the communication unit 22 transmits the text data regarding the registration information to the second server 30. As a result, the first server 20 transmits the text data regarding the registration information to the second server 30.

In step S51, the communication unit 32 of the second server 30 receives the text data regarding the registration information.

In step S52, the second server 30 performs the second transmission process by executing the registration command ε1 included in the registration information. As a result, a process performed by the second server 30 ends.

Next, the second transmission process will be described with reference to FIGS. 8, 13, 15B, and 15C. FIG. 13 is a flowchart illustrating the second transmission process.

Figure 13:
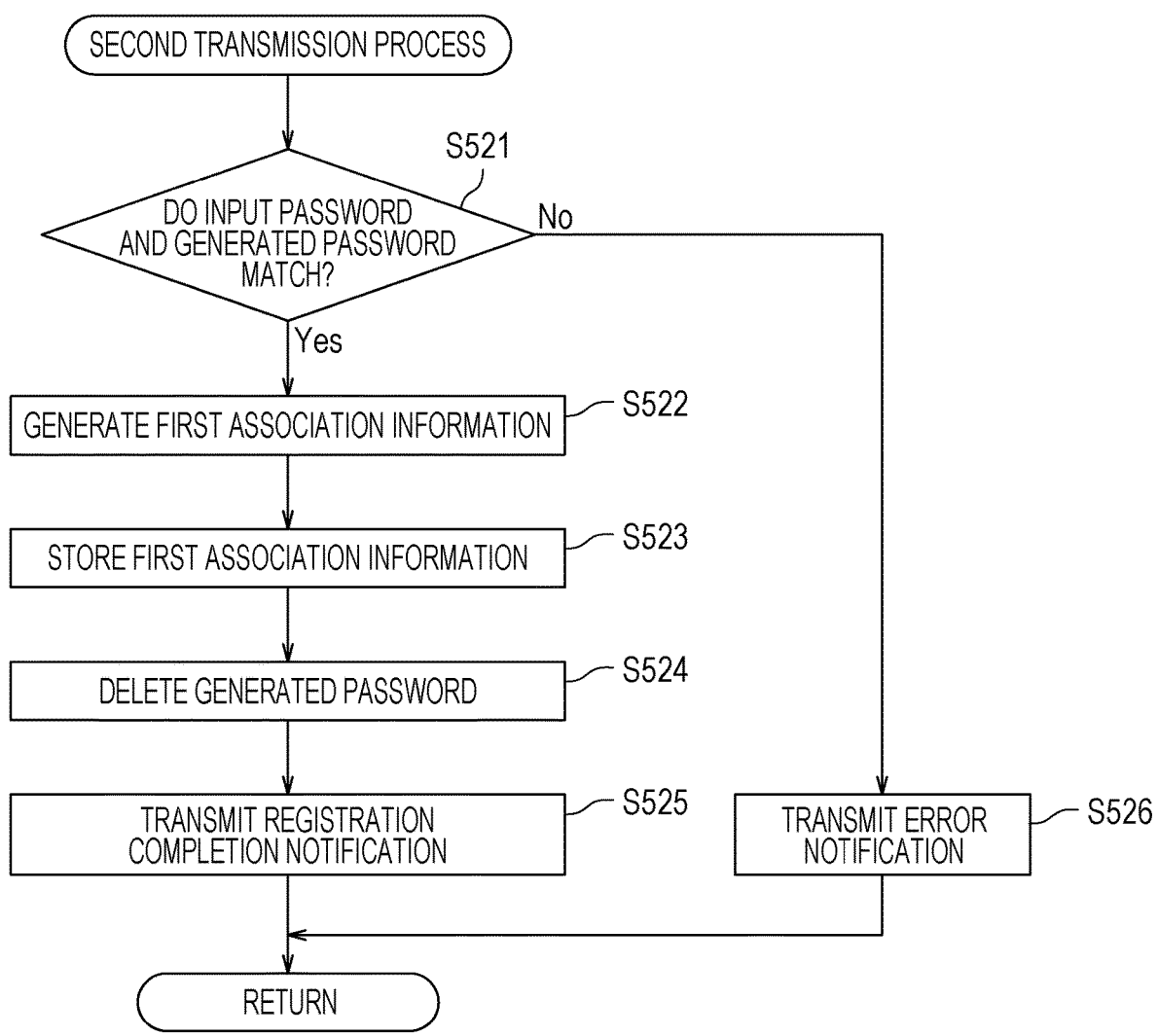
FIG. 13 is a flowchart illustrating a second transmission process.

As illustrated in FIGS. 8 and 13, in step S521, the determination unit 33c of the second server 30 determines whether there is a generated password corresponding to the input password ε2. In other words, the determination unit 33c of the second server 30 determines whether the input password ε2 and the generated password γ1 match.

If the input password ε2 and the generated password γ1 match (YES in step S521), the process proceeds to step S522.

If the input password ε2 and the generated password γ1 do not match (NO in step S521), the process proceeds to step S526.

If the deletion unit 33d has deleted the generated password γ1 from the database DB before the determination unit 33c determines whether the input password ε2 and the generated password γ1 match, the determination unit 33c determines that the input password ε2 and the generated password γ1 do not match. That is, after the certain period of time has elapsed since the password γ1 was generated, the determination unit 33c determines that the input password ε2 and the generated password γ1 do not match regardless of whether the input password ε2 and the generated password γ1 actually match. In this case, therefore, a result of step S521 is NO, and the process proceeds to step S526.

In step S522, the information generation unit 33e of the second server 30 generates the first association information 41. The first association information 41 is the identification information α1 (refer to FIG. 12) regarding the first sound reception apparatus 101 included in the registration information and the identification information β1 (refer to FIG. 8) regarding the first display apparatus X1 included in the pair information A associated with each other.

In step S523, the information generation unit 33e of the second server 30 adds the first association information 41 to the database DB. As a result, the first association information 41 is stored in the storage unit 31.

In step S524, the deletion unit 33d of the second server 30 deletes the generated password γ1 from the database DB.

In step S525, the control unit 33a controls the communication unit 32 such that the communication unit 32 transmits a registration completion notification to the first display apparatus X1. As a result, the second server 30 transmits the registration completion notification to the first display apparatus X1. The registration completion notification indicates that the registration of the first display apparatus X1 has been successfully completed. When the second server 30 has transmitted the registration completion notification, the second transmission process ends.

The communication unit 4 of the first display apparatus X1 receives the registration completion notification. The control unit 5 of the first display apparatus X1 then controls the display unit 1 such that the display unit 1 displays an image of the registration completion notification. As a result, the display unit 1 of the first display apparatus X1 displays the image of the registration completion notification.

Figure 15B:
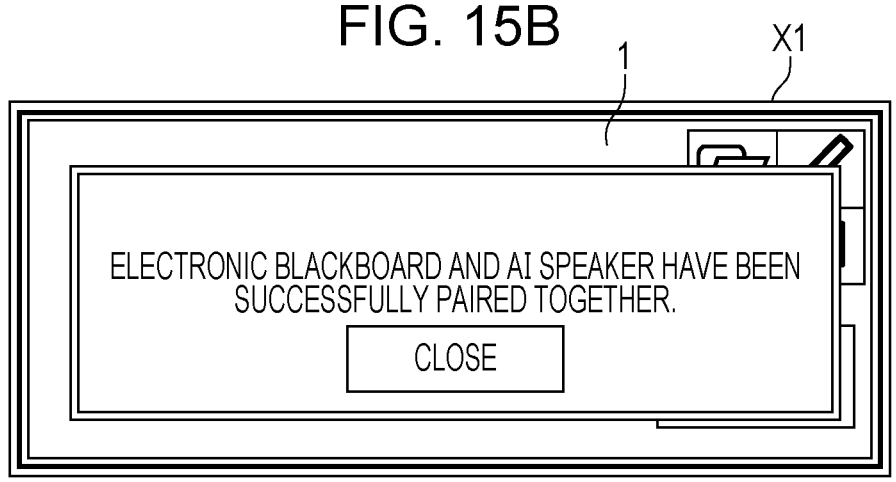
FIG. 15B is a diagram illustrating an example of an image of a registration completion notification displayed on the display unit.

FIG. 15B is a diagram illustrating an example of the image of the registration completion notification displayed on the display unit 1. In FIG. 15B, if an image of "Close" in the image of the registration completion notification is selected using the input unit 2, the image of the registration completion notification is deleted from the display unit 1. When a certain period of time has elapsed since the display unit 1 displayed the image of the registration completion notification, the image of the registration completion notification is deleted from the display unit 1.

Alternatively, in step S525, the first sound reception apparatus 101 may output a speech sound of information indicating the registration completion notification. In this case, the second server 30 transmits the information indicating the registration completion notification to the first sound reception apparatus 101 through the first server 20.

As illustrated in FIG. 13, in step S526, the control unit 33a controls the communication unit 32 such that the communication unit 32 transmits an error notification to the first server 20. As a result, the second server 30 transmits the error notification to the first server 20. In this case, the information generation unit 33e of the second server 30 does not generate the first association information 41. When the second server 30 has transmitted the error notification, the second transmission process ends.

The communication unit 4 of the first display apparatus X1 receives the error notification. The control unit 5 of the first display apparatus X1 then controls the display unit 1 such that the display unit 1 displays an image of the error notification. As a result, the display unit 1 of the first display apparatus X1 displays the image of the error notification.

Figure 15C:
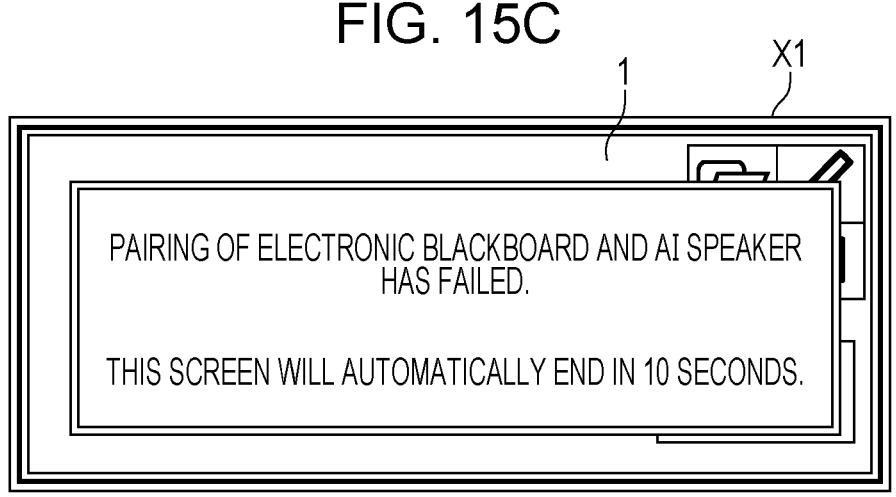
FIG. 15C is a diagram illustrating an example of an image of an error notification displayed on the display unit.
Figure 17A:
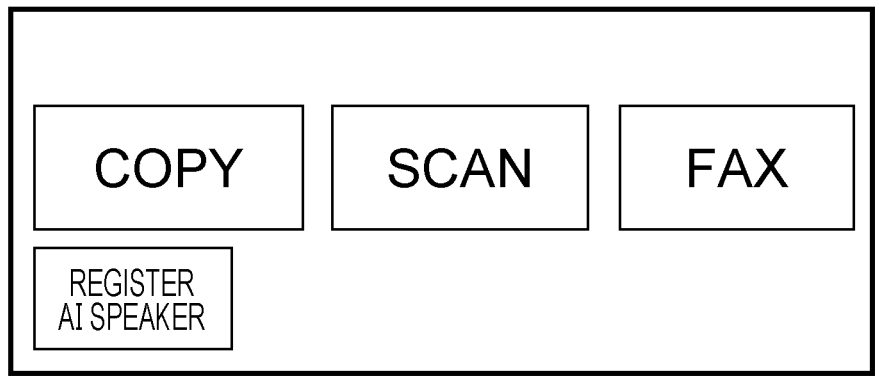
FIGS. 17A to 17C are diagrams illustrating images displayed on a display unit of an image forming apparatus.
Figure 17B:
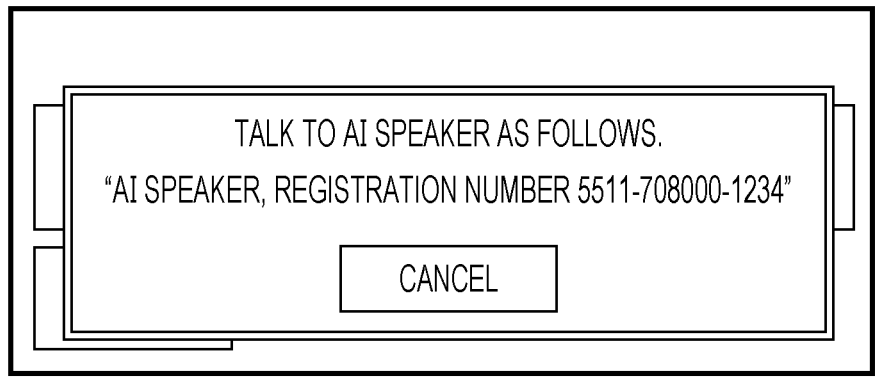
Figure 17C:
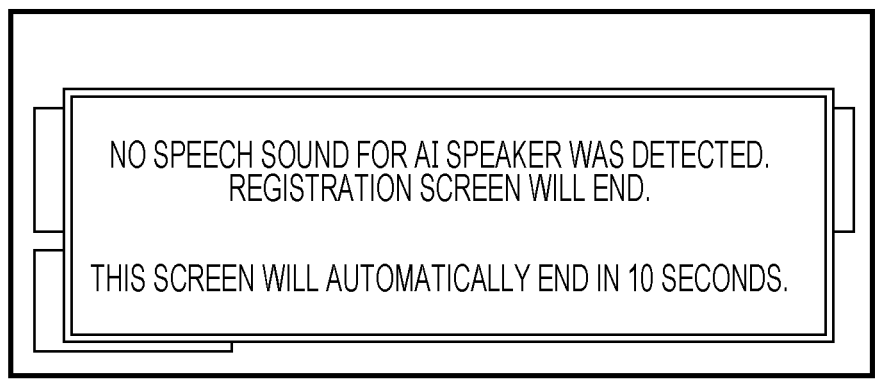
Figure 18A:
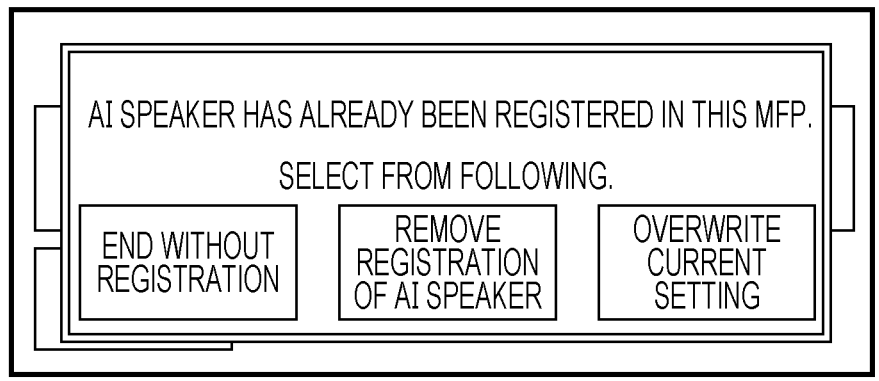
FIGS. 18A to 18C are diagrams illustrating images displayed on the display unit of the image forming apparatus.
Figure 18B:
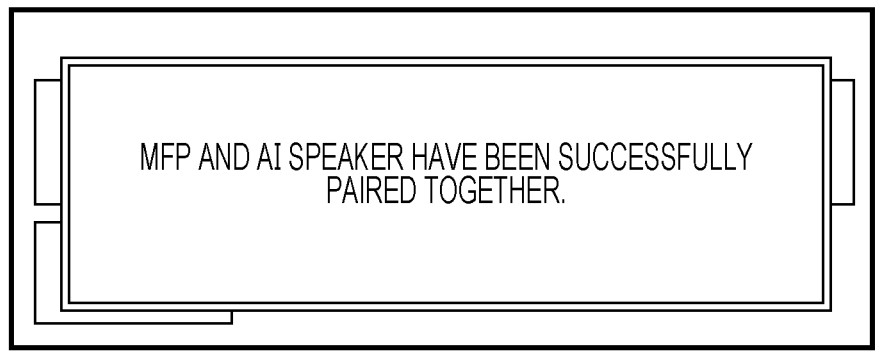
Figure 18C:
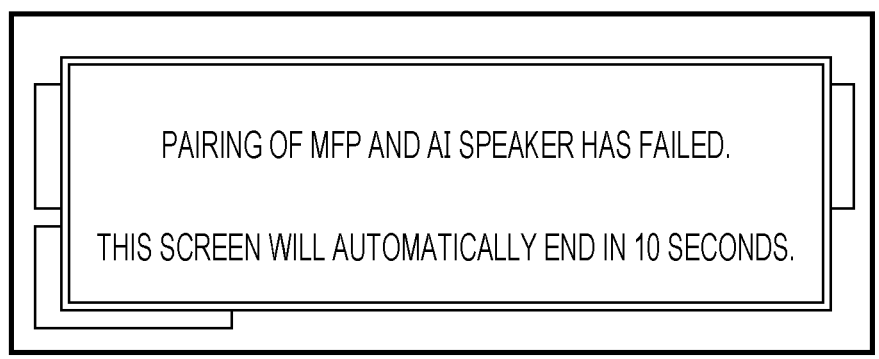

FIG. 15C is a diagram illustrating an example of the image of the error notification displayed on the display unit 1. In FIG. 15C, if an image of "Close" in the image of the error notification is selected using the input unit 2, the image of the error notification is deleted from the display unit 1. When a certain period of time has elapsed since the display unit 1 displayed the image of the error notification, the image of the error notification is deleted from the display unit 1.

As has been described with reference to FIGS. 8, 12, 13, 15B, and 15C, if the user inputs the password ε2 to the first sound reception apparatus 101, the information generation unit 33e generates the first association information 41 on the basis of a result of a determination made by the information generation unit 33e as indicated by steps S31, S521, S522, and S526 (refer to FIGS. 12 and 13). When associating the first display apparatus X1 and the first sound reception apparatus 101 with each other, therefore, the user need not take the trouble to install an application used for the association on a mobile terminal such as a mobile application. As a result, the user can easily associate the first display apparatus X1 and the first sound reception apparatus 101 with each other. In addition, the first display apparatus X1 and the first sound reception apparatus 101 can be associated without the information processing system 100 becoming complex.

As indicated by steps S221 and S222 (refer to FIG. 10), if the registration information regarding the first display apparatus X1 has not been generated, the generation unit 33b generates the password γ1. The first display apparatus X1 is therefore not registered redundantly.

An embodiment of the present disclosure has been described with reference to the drawings (FIGS. 1 to 16). The present disclosure is not limited to the embodiment and may be implemented in any manner without deviating from the scope thereof (e.g., (1) to (9)). In addition, various techniques can be achieved by combining together a plurality of components disclosed in the embodiment. For example, some components described in the embodiment may be omitted. The drawings schematically illustrate the components to facilitate understanding, and the number of pieces of each component might be different in practice. The components described in the embodiment are examples, and the present disclosure is not limited to these components. The components may be modified in various ways without deviating from effects produced by the present disclosure.

(1) An example of the reception apparatus in the present disclosure is the sound reception apparatus 10. The present disclosure, however, is not limited to this. As a second example of the reception apparatus in the present disclosure, a terminal such as a mobile terminal or a PC may be used. In this case, an instruction for the display apparatus X is received using an input unit of the terminal, such as a keyboard, a mouse, or a touch panel. The first server 20 according to the embodiment is a server having a function of recognizing speech sound. The present disclosure, however, is not limited to this. The first server 20 may be any apparatus insofar as data corresponding to instructions received by the sound reception apparatus 10 and the reception apparatus such as a terminal can be generated in a memory of the first server 20. For example, the first server 20 may be a server of Twitter (registered trademark). The second server 30 obtains, through the reception apparatus, an instruction for the display apparatus X posted on Twitter. The second server 30 may then generate a control command for the display apparatus X on the basis of the instruction obtained from the server of Twitter.

(2) The electronic apparatus in the embodiment is the display apparatus X. The present disclosure, however, is not limited to this. The electronic apparatus may be any apparatus that can be controlled by the reception apparatus. The electronic apparatus may be, for example, an MFP, a PC, a washing machine, a vacuum cleaner, a lighting device, or an air conditioner, instead.

(3) In the embodiment, the input unit 2 of the first display apparatus X1 receives an instruction to generate a password (refer to FIGS. 8 and 9). The present disclosure, however, is not limited to this. If the first display apparatus X1 is communicably connected to the terminal (e.g., a mobile terminal or a PC), an input unit (e.g., a keyboard, a mouse, or a touch panel) of the terminal may receive the instruction, instead.

(4) In the embodiment, the output unit 12 of the first sound reception apparatus 101 outputs a speech sound indicating a registration completion notification or a speech sound indicating an error notification (refer to steps S332 and S333). The present disclosure, however, is not limited to this. For example, the output unit 12 may be a display device such as a display, instead. In this case, the display device displays an image indicating a registration completion notification or an image indicating an error notification. In addition, the output unit 12 may be a printing device such as a printer, instead. In this case, the printing device prints an image indicating a registration completion notification or an image indicating an error notification on a sheet of paper.

(5) The generated password γ1 in the embodiment is a one-time password that is deleted after a certain period of time elapses or after a single use. The present disclosure, however, is not limited to this. The generated password γ1 need not be deleted from the database DB even if the certain period of time elapses. In addition, the generated password γ1 need not be deleted from the database DB after the first association information 41 is generated. That is, step S524 (refer to FIG. 13) need not be performed. As a result, a process performed by the information processing system 100 can be simplified. When the generated password γ1 is a one-time password as in the embodiment, however, security of the information processing system 100 improves.

(6) In the embodiment, the input unit 11 of the first sound reception apparatus 101 receives a speech sound indicating the input password ε2 in step S31 (refer to FIGS. 8 and 12). In step S521 (refer to FIG. 13,) the determination unit 33c of the second server 30 determines whether the input password ε2 and the generated password γ1 match. If the input password ε2 and the generated password γ1 match, the information generation unit 33e of the second server 30 generates the first association information 41 in step S522. In the embodiment, therefore, the input password ε2 is used as determination information for generating the first association information 41. The present disclosure, however, is not limited to this.

Determination information according to a modification will be described with reference to FIG. 16. FIG. 16 is a diagram illustrating the determination information according to the modification.

As illustrated in FIG. 16, the input password ε2 and the identification information β1 regarding the first display apparatus X1 may be used as the determination information. In this case, the user inputs the password ε2 and the identification information β1 regarding the first display apparatus X1 to the input unit 11 of the first sound reception apparatus 101 in step S31 illustrated in FIG. 12. In step S521 illustrated in FIG. 13, the determination unit 33c of the second server 30 determines whether the input password ε2 and the generated password γ1 match. The determination unit 33c of the second server 30 then determines whether the identification information β1 input to the first sound reception apparatus 101 and the identification information β1 included in the pair information A match. If the input password ε2 and the generated password γ1 match and the identification information β1 input to the first sound reception apparatus 101 and the identification information β1 included in the pair information A also match, the information generation unit 33e generates the first association information 41 in step S521. As a result, the security of the information processing system 100 improves compared to when only the input password ε2 is used as the determination information.

Alternatively, as the determination information, a model of the first display apparatus X1, a location of the first display apparatus X1, an IP address of the first display apparatus X1, a name of a company at which the first display apparatus X1 is installed, a name of a manager of the first display apparatus X1, and/or a password set by the manager, for example, may be used.

(7) In the embodiment, the generation unit 33b of the second server 30 generates the password γ1 in step S222 (refer to FIG. 10). The present disclosure, however, is not limited to this. For example, the control unit 5 of the first display apparatus X1 may generate the password γ1, instead.

An example of a process for generating the password γ1 performed by the control unit 5 of the first display apparatus X1 will be described hereinafter with reference to FIGS. 8 and 9.

In step S12, the control unit 5 of the first display apparatus X1 generates the password γ1 corresponding to the identification information β1 regarding the first display apparatus X1. The control unit 5 of the first display apparatus X1 then controls the communication unit 4 such that the communication unit 4 transmits the identification information β1 regarding the first display apparatus X1 and the generated password γ1 to the second server 30. In this case, the generation of the password γ1 performed by the generation unit 33b of the second server 30 in step S222 (refer to FIG. 10) need not be performed.

Alternatively, a device other than the generation unit 33b of the second server 30 may generate the password γ1 as described hereinafter.

In this case, for example, the control unit 5 of the first display apparatus X1 or a terminal communicably connected to the second server 30 generates the password γ1 in step S222 in accordance with an instruction from the second server 30. The first display apparatus X1 or the terminal then transmits the generated password γ1 to the second server 30.

As a result, the second server 30 obtains the generated password γ1, and the process proceeds to step S223.

(8) Images displayed on a display unit of an image forming apparatus such as an MFP when the image forming apparatus is used as an example of the electronic apparatus in the present disclosure will be described with reference to FIGS. 17A to 18C. The display unit of the image forming apparatus displays, for example, images indicating available functions of the image forming apparatus. For example, the display unit displays an image of "Copy", an image of "Scan", and an image of "Fax" as the images of the available functions of the image forming apparatus. The display unit of the image forming apparatus also functions, for example, as a touch panel. The user can therefore select a desired function by touching an image indicating the desired function on the display unit of the image forming apparatus. FIGS. 17A to 18C illustrate images displayed on the display unit of the image forming apparatus when the image forming apparatus is registered in the second server 30. The registration of the image forming apparatus is performed in the same procedure as the above-described registration of the first display apparatus X1 (refer to FIGS. 9 to 13). The images displayed on the display unit of the image forming apparatus when the image forming apparatus is registered are therefore similar to those displayed on the display unit 1 of the first display apparatus X1 when the first display apparatus X1 is registered. FIGS. 17A to 18C correspond to FIGS. 14A to 15C, respectively.

(9) Although the user inputs the password ε2 to the first sound reception apparatus 101 in step S31 in the above embodiment, a method for inputting the password ε2 is not limited to this. For example, a terminal such as a mobile terminal or a PC obtains the generated password γ1 from the second server 30, and a speaker of the terminal outputs the generated password γ1 as a speech sound. The first sound reception apparatus 101 may then receive the speech sound indicating the generated password γ1 output from the speaker of the terminal as the input password ε2. As a result, not only does the convenience of the user improve, but the speech sound to be associated can be securely recognized, since the terminal accurately outputs the speech sound instead of the user who might not pronounce the input password ε2 accurately, which can make it difficult for the first sound reception apparatus 101 (AI speaker) to recognize the input password ε2.

The present disclosure is applicable in fields of information processing systems, servers, and methods for generating association information.

The present disclosure contains subject matter related to that disclosed in Japanese Priority Patent Application JP 2018-044506 filed in the Japan Patent Office on Mar. 12, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. An information processing system comprising:
a reception apparatus that receives an instruction for an electronic apparatus, the reception apparatus being separate from the electronic apparatus;
a first server that generates data corresponding to the instruction received by the reception apparatus; and a second server that generates a control command for the electronic apparatus corresponding to the data and that transmits the control command to the electronic apparatus, wherein the reception apparatus includes
   an input unit that receives an input password, and
   a transmission unit that transmits the input password and identification information regarding the reception apparatus, and wherein the second server includes
   a first reception unit that receives identification information regarding the electronic apparatus,
   a transmission unit that transmits a password generated in accordance with the identification information regarding the electronic apparatus to an output unit capable of outputting the generated password,
   a second reception unit that receives the input password and the identification information regarding the reception apparatus,
   a determination unit that determines whether the input password and the generated password match,
   an information generation unit that generates, on a basis of a result of the determination made by the determination unit, association information by associating the identification information regarding the electronic apparatus and the identification information regarding the reception apparatus with each other,
   a registration determination unit that determines whether registration information regarding the electronic apparatus has been generated, and
   a generation unit that generates the generated password if the registration information regarding the electronic apparatus has not been generated, wherein if the registration information regarding the electronic apparatus has been generated, the generation unit does not generate the generated password.

2. The information processing system according to claim 1,
wherein the reception apparatus receives a speech sound indicating the instruction for the electronic apparatus, and
wherein the first server generates data corresponding to the speech sound received by the reception apparatus.

3. The information processing system according to claim 1,
wherein, if the input password and the generated password match, the information generation unit generates the association information.

4. The information processing system according to claim 1,
wherein the second server further includes
   a storage unit that stores a database including the generated password, and
   a deletion unit that deletes the generated password from the database when a certain period of time has elapsed since the password was generated, and
wherein, if the deletion unit has deleted the generated password from the database before the determination unit determines whether the input password and the generated password match, the determination unit determines that the input password and the generated password do not match.

5. The information processing system according to claim 4,
wherein the deletion unit deletes the generated password from the database after the information generation unit generates the association information.

6. A server included in an information processing system including a reception apparatus that receives an instruction for an electronic apparatus, the reception apparatus being separate from the electronic apparatus, a first server that generates data corresponding to the instruction received by the reception apparatus, and a second server that generates a control command for the electronic apparatus corresponding to the data and that transmits the control command to the electronic apparatus, the second server comprising:
   a first reception unit that receives identification information regarding the electronic apparatus;
   a transmission unit that transmits a password generated in accordance with the identification information regarding the electronic apparatus to an output unit capable of outputting the generated password;
   a second reception unit that receives an input password and identification information regarding the reception apparatus transmitted from the reception apparatus;
   a determination unit that determines whether the input password and the generated password match;
   an information generation unit that generates, on a basis of a result of the determination made by the determination unit, association information by associating the identification information regarding the electronic apparatus and the identification information regarding the reception apparatus with each other,
   a registration determination unit that determines whether registration information regarding the electronic apparatus has been generated, and
   a generation unit that generates the generated password if the registration information regarding the electronic apparatus has not been generated,
wherein if the registration information regarding the electronic apparatus has been generated, the generation unit does not generate the generated password.

7. A method for generating association information used by an information processing system including a reception apparatus that receives an instruction for an electronic apparatus, the reception apparatus being separate from the electronic apparatus, a first server that generates data corresponding to the instruction received by the reception apparatus, and a second server that generates a control command for the electronic apparatus corresponding to the data and that transmits the control command to the electronic apparatus, the method comprising:
   receiving, using the second server, identification information regarding the electronic apparatus;
   transmitting, using the second server, a password generated in accordance with the identification information regarding the electronic apparatus to an output unit capable of outputting the generated password;
   outputting, using the output unit, the generated password;
   receiving, using the reception apparatus, an input password;
   transmitting, using the reception apparatus, the input password and identification information regarding the reception apparatus;
   receiving, using the second server, the input password and the identification information regarding the reception apparatus;
   determining, using the second server, whether the input password and the generated password match;

generating, using the second server on a basis of a result of the determining performed using the determination unit, association information by associating the identification information regarding the electronic apparatus and the identification information regarding the reception apparatus with each other, determining whether registration information regarding the electronic apparatus has been generated; and generating the generated password if the registration information regarding the electronic apparatus has not been generated, wherein if the registration information regarding the electronic apparatus has been generated, the generation unit does not generate the generated password.

8. The information processing system according to claim 1, wherein if the registration information regarding the electronic apparatus has been already generated, the transmission unit of the second server transmits an error notification to the electronic apparatus.

\* \* \* \* \*